July 1, 1952
R. J. FAHEY ET AL
2,601,750
CARTON HANDLING AND LOADING APPARATUS
Filed Nov. 23, 1946
5 Sheets-Sheet 3
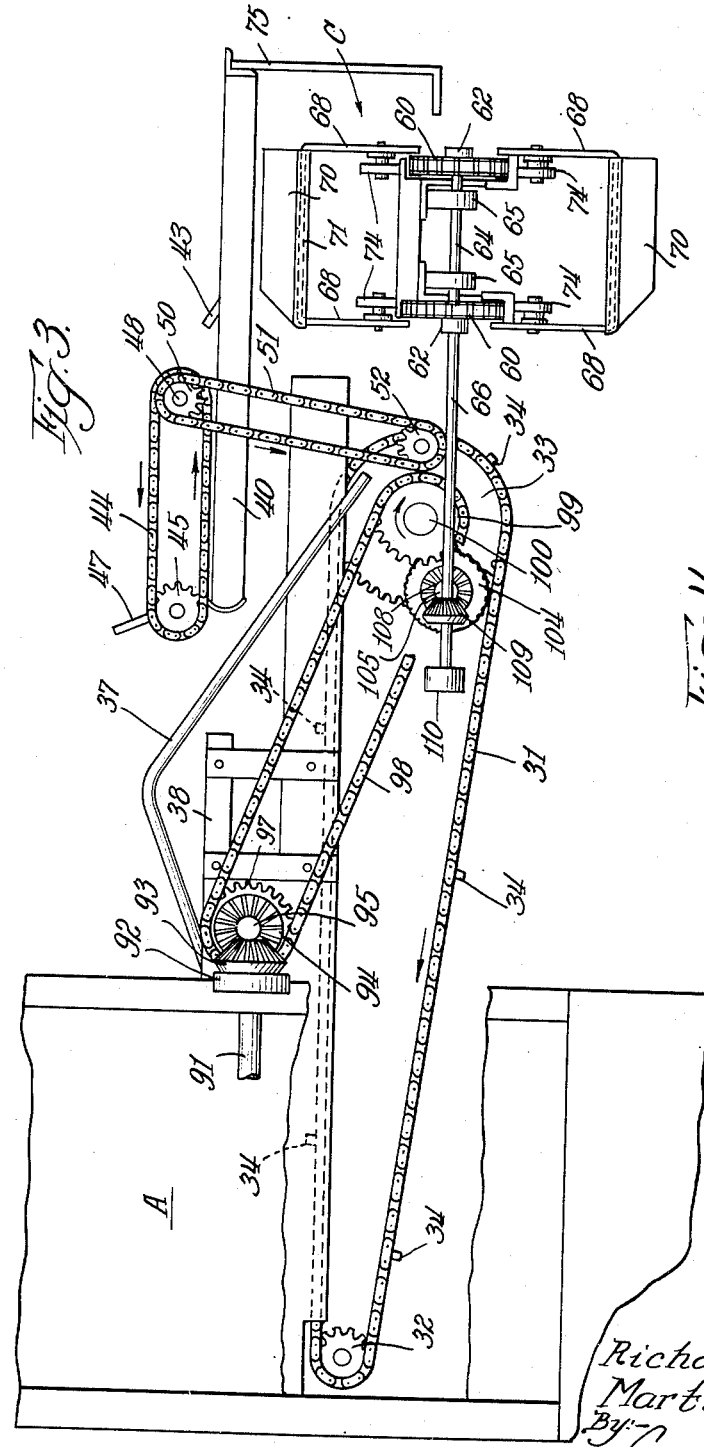
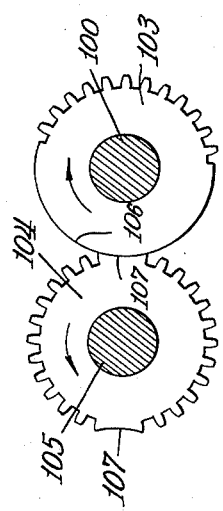
INVENTORS:
Richard J. Fahey
Martin Burger
By Cromwell, Greist & Warden
Att'ys July 1, 1952 R. J. FAHEY ET AL 2,601,750
CARTON HANDLING AND LOADING APPARATUS
Filed Nov. 23, 1946 5 Sheets-Sheet 4
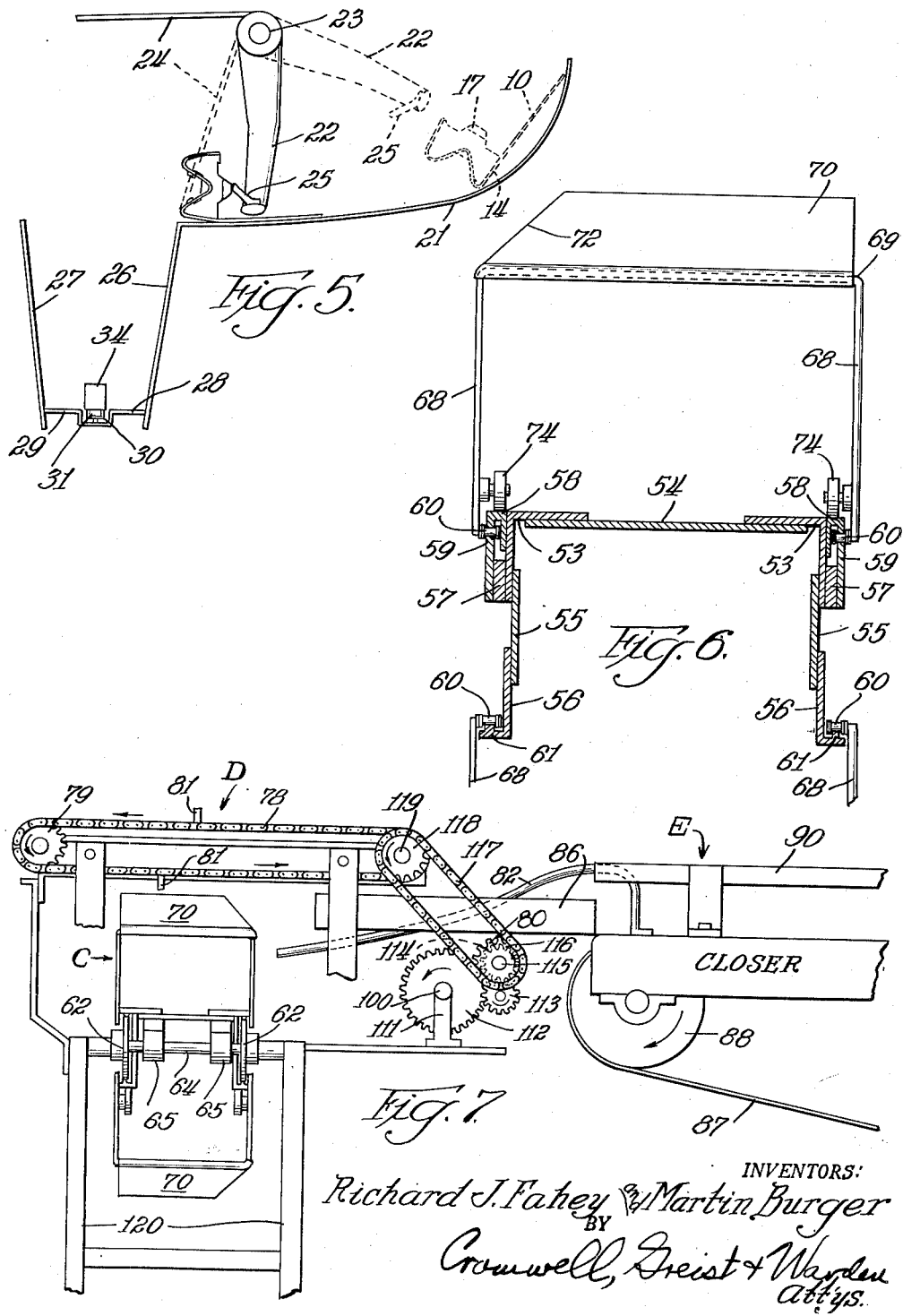
INVENTORS:
Richard J. Fahey & Martin Burger
BY
Cromwell, Greist & Warden
Attys.

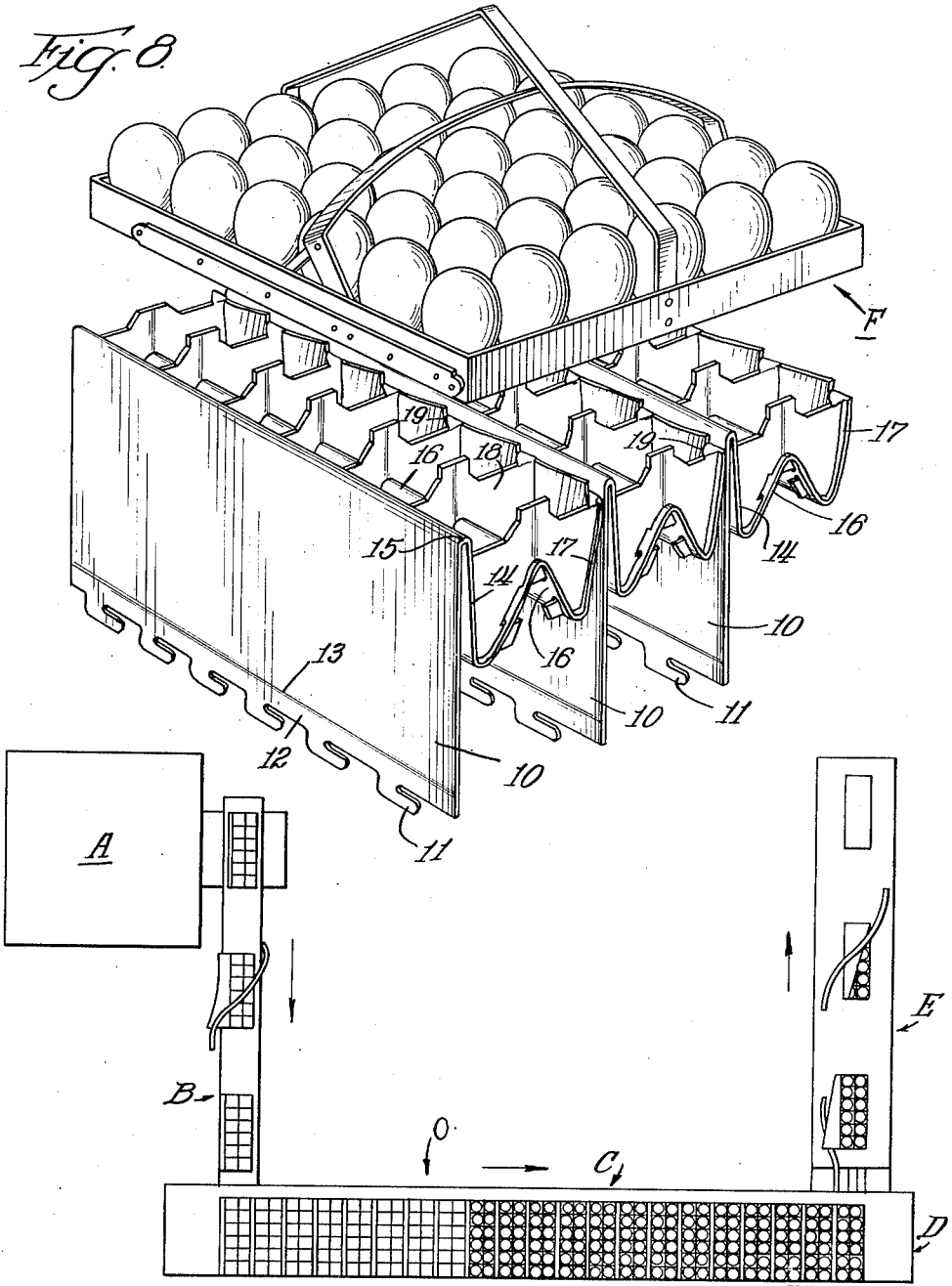

Patented July 1, 1952

2,601,750

UNITED STATES PATENT OFFICE 2,601,750

CARTON HANDLING AND LOADING APPARATUS

Richard J. Fahey, Evanston, and Martin Burger, Morris, Ill., assignors to Shellmar Products Corporation, Chicago, Ill., a corporation of Delaware Application November 23, 1946, Serial No. 711,992

20 Claims. (Cl. 53—16)

The present invention relates to improvements in an egg carton handling apparatus and method.

A very high percentage of all eggs is presently sold to consumers in egg cartons, and a large portion thereof is packed in the so-called 2 x 6 style, hinged-cover carton which is popular by reason of the fact that its dimensions permit the same to be packed conveniently in a standard egg case, packing thirty-dozen size carton to the case, since three of such cartons, placed abreast, occupy no more lateral space in the egg case than does the conventional 6 x 6 filler and flat assembly. Moreover, for the purposes of the present invention, the similarity, as to size, of three 2 x 6 cartons placed abreast, with their covers open and downwardly retracted, to a standard square 6 x 6 filler is such that the cells of the thus positioned cartons coincide with the arrangement of the egg-holding cells of the filler.

Egg cartons are usually packed with eggs of a single size or grade, and all egg packers, whether they purchase case lot eggs in already candled and graded condition or whether they candle and grade the eggs in their own plants, generally have large quantities of loose eggs of a single grade available in fillers for cartoning, requiring only that the eggs be placed in cartons. Under present methods the egg cartons are manually filled, one at a time, and such handling is extremely time consuming in plants where large quantities of eggs are handled.

Since, as previously stated, three 2 x 6 egg cartons, placed abreast, present their cells in a position coinciding with the position of the cells of a conventional filler, it follows that if three cartons are so positioned and their covers retracted vertically downwardly from their usual upstanding condition, it is possible to fill three cartons at a time by the use of standard egg lifting or handling apparatus which is well known to those skilled in the art and which permits three dozen eggs to be picked up at a time, usually from the square flat accompanying a filler of the type referred to above.

It is therefore one object of the invention to provide apparatus which will automatically position a plurality of egg cartons abreast for filling, holding the covers of such cartons in a vertically down-folded condition so as not to interfere with the filling operation, whereby the eggs may be transferred to the cartons by separate apparatus capable of picking up and transferring a large number of eggs at a time.

An additional object of the invention is to provide apparatus which is operative to feed empty cartons discharged thereto one at a time by a carton set-up machine and to fold back the covers of the cartons into vertically downwardly extending position adjacent a carton side wall, during the advance of the cartons, along with means whereby at least three cartons are positioned abreast for filling as a unit.

A still further object is to provide, in combination with apparatus of the type referred to, means which, after the cartons are filled, operates to discharge said cartons from their side-by-side arrangement, to restore the covers to upstanding position for action thereon by a carton closing machine, or other apparatus.

Still another object is to provide a novel and improved method for the expedited handling and cartoning of eggs or similar articles, employing a minimum of relatively unskilled personnel.

The above and other objects and advantages will be evident upon a consideration of the following description of a preferred embodiment of the invention and by reference to the accompanying drawings, in which:

Fig. 3 is a side elevation looking from the left of Fig. 2;

Fig. 4 is a diagrammatic side elevation of two typical segmented gears for giving intermittent movement to the above referred to carton conveying mechanism;

Fig. 5 is a diagrammatic side elevation of certain mechanism associated with a carton set-up machine to initiate discharge of cartons in proper timed relation to the carton advancing mechanism;

Fig. 6 is a fragmentary view in transverse section of the intermittent carton conveying mechanism, taken along line 6—6 of Fig. 1;

Fig. 7 is a diagrammatic end elevation particularly illustrating the carton discharge mechanism and the drive means therefor;

Fig. 8 is a diagrammatic illustration of three 2 x 6 capacity cartons placed abreast in the manner in which they are positioned and held for filling during an interruption in the movement of a carton conveyor mechanism, also showing a typical egg handling device which may be used to fill said three cartons as a unit; and Fig. 9 is a schematic showing of the steps through which egg cartons progress in the operation of the apparatus.

A popular carton of the 2 x 6 type, capable of being packed 30 dozen to a case, is that described in Reissue Patent No. 18,922 to Troyk, dated August 22, 1933. Cartons of this type may be erected from a knocked-down condition in which they are shipped to users, by the device described in Burger U. S. Patent No. 2,018,396, and, after being filled, may be closed by machines of the type described in Burger U. S. Patent No. 1,994,241.

Figure 2:
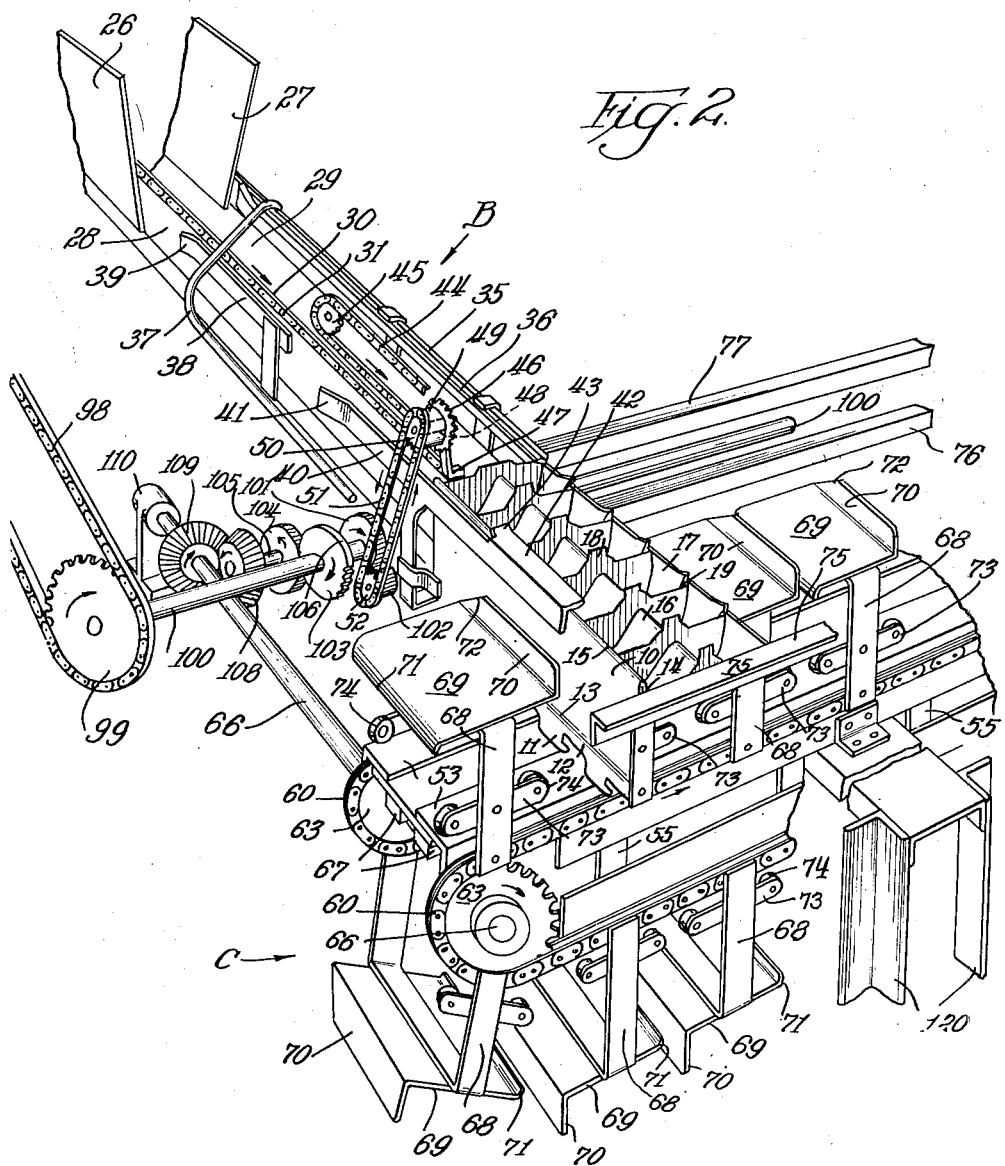
Fig. 2 is a fragmentary perspective view showing particularly the drive mechanism for the apparatus, the individual carton advance conveyor and a portion of an intermittently operating carton conveying mechanism.

A Troyk type carton is shown on the drawings in Figs. 2, 8 and 9, and as shown therein, each carton comprises a cover 10 having locking hooks 11 on a cover locking strip 12 thereof which is foldable with respect to the cover along a score line 13. The cover is foldable with respect to a rear wall 14 along a bend or fold line 15. The reference numeral 16 designates an inverted, generally V-shaped unitary bottom and longitudinal partition, while numeral 17 denotes a front wall. A plurality of individual transverse partitions 18 are swingable on hinges 19 between the walls 14, 17 and, in the set-up condition of the carton, said transverse partitions are interlocked with the bottom 16 in a well known fashion.

Figure 1:
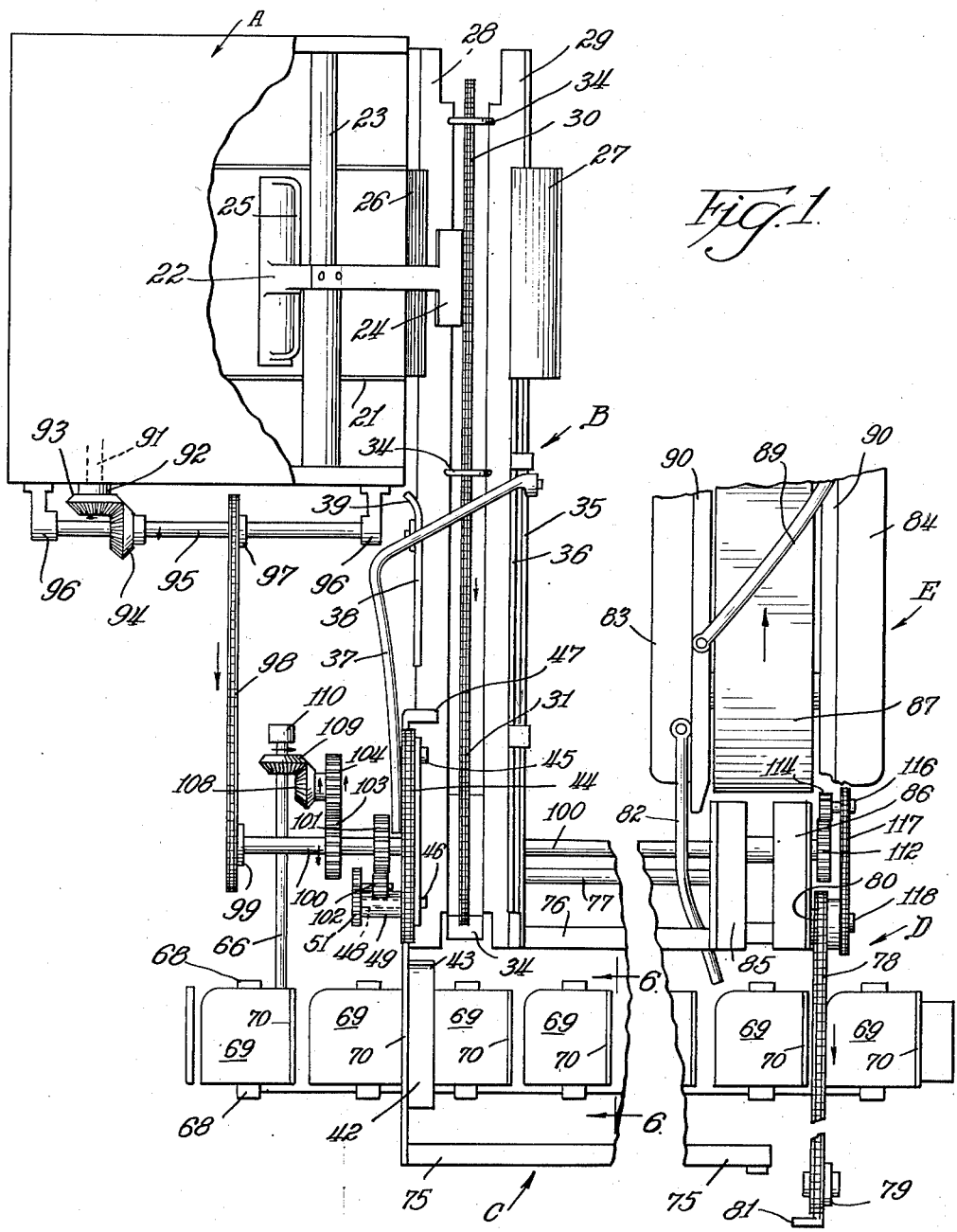
Fig. 1 is a diagrammatic top plan view of the entire apparatus of the invention, being partially broken to show in a single view the several coordinated operating mechanisms of which the apparatus is composed.

Referring now to Figs. 1 and 3, reference character A indicates generally a diagrammatically shown carton set-up machine of the type described in Burger U. S. Patent No. 2,018,396 mentioned hereinabove. This set-up machine is provided with an arcuate, downwardly and outwardly extending discharge chute 21, see Fig. 5, from which the set-up cartons may discharge from the machine by gravity. At the time of their discharge from the set-up machine, the cartons have their covers 10 extending upwardly generally in the plane of the rear wall 14, as illustrated in Fig. 3. A shaft 23, operated by certain mechanism (not shown) to swing through an arc of about 90°, is provided as a part of carton set-up machine A, said shaft having a generally T-shaped arm 22 fixedly mounted thereon above chute 21 and also a T-shaped stop member 24. Arm 22 and stop member 24 are positioned at substantially right angles to one another and oscillate with shaft 23.

The angle and curvature of arcuate chute 21 are such that on the reverse stroke of arm 22, i. e., to the right in Fig. 5, cartons discharged from the set-up mechanism will normally pass gravitationally therebelow, and the timing of its swing with respect to said carton set-up mechanism is such as to normally permit such result. At the time shaft 23 has rotated to its most reversed position, as indicated in dotted lines in Fig. 5, stop member 24 is swung down to bar the end of discharge chute 21, as also shown in dotted lines, thereby preventing any carton from being prematurely discharged onto the carton advance mechanism hereinafter described. Each carton ordinarily comes to rest considerably short of the discharge end of such chute, but stop member 24 serves to prevent accidental premature discharge of a carton from chute 21 under any circumstance.

Regardless of the position of the carton in the chute, the transverse bar 25 mounted on the T-head of arm 22 operates on its downward swing to contact and advance each carton. Bar 25 is so positioned that it engages the carton along the upper edges of its upstanding transverse partitions 18, somewhat to one side of longitudinal partition 16, and sweeps it out of chute 21 into a trough formed by the spaced upwardly extending and angularly divergent trough sides 26, 27.

The distance between trough sides 26, 27 adjacent the bottom of the trough formed thereby is but slightly greater than the width of the set-up carton body, and said sides therefore act as guides to insure that cartons, in being swept from chute 21 by arms 2, position themselves properly on their bottoms and in longitudinal alignment with a carton advancing mechanism, generally designated B, which travels through the trough.

The lower edges of trough sides 26, 27 merge, as particularly shown in Fig. 2, with the top of the conveyor mechanism B, which in part comprises a pair of spaced horizontal longitudinally extending, smooth-surfaced plates 28, 29 having between them a central, longitudinally extending, groove or slot 30, see Figs. 1, 2 and 5. The upper flight of a roller chain 31 is adapted to travel in slot 30 in the direction indicated by arrows in Figs. 1, 2 and 3, over spaced sprockets 32, 33 borne for rotation on suitable shafts, one of which is a drive shaft designated 100 in Fig. 3, which performs other functions to be described. At intervals throughout its length chain 31 carries carton advancing lugs 34 which are adapted to rearwardly engage and advance egg cartons deposited on the surface of plates 28, 29. The manner of actuating chain 31 will be later described.

A lateral carton guide 35 is positioned on brackets to extend parallel to and at one longitudinal side of top plate 29 and serves to prevent cartons from being laterally displaced from the carton advance mechanism during travel therealong, and adjacent guide 35 is a further bracket-mounted guide 36 positioned above plate 29 at such level as to partially overlie and firmly hold down the carton body during the advance of the cartons on the plates.

Fixedly attached to one of the brackets which supports guides 35, 36 is a carton cover rotating and retracting member 37 which extends upwardly above and forwardly of one side of the carton advance conveyor a predetermined distance, then angles forwardly thereacross in vertically spaced relation thereto, and then extends downwardly and forwardly at the opposite side of the apparatus, as shown in Figs. 1 and 2, its free end being in laterally spaced relation to one side of adjacent top plate 28. During the advance of cartons along plates 28, 29, the upwardly extending carton covers 10 contact cover rotating member 37, the angular disposition of such member forcing the carton covers backwardly and progressively folding them downwardly along carton fold line 15 into a final, vertically downward position parallel to the adjacent carton rear wall 14.

In order to further laterally brace and retain each carton during the cover rotating and depressing operation, a short lateral guide 38 having the horizontally outwardly bent fore-lip 39 is positioned opposite guide 35 and below carton depressing member 37. Forwardly of lateral guide 38 is a carton cover retaining guide 40 having an outwardly bent entry nose 41 engageable with the depressed cover as the carton advances to hold said cover in vertically downward retracted position, and adjacent its end the guide 40 has an angled sectional outline defining a reland the downturned inner area of the carton cover being in contact with the exterior of the lip of the carton supporting arm which follows it. The carton covers extend downwardly into the spaces between the adjacent carton supporting members. The above described operation continues as the cartons come abreast of one another, advancing the length of conveyor C during intermittent stops of the apparatus, being filled during such stops and approaching the filled carton removing mechanism designated D, which will now be described.

Referring again to Fig. 1, parallel cross braces 76, 77 are provided between the carton advance mechanism B and the filled carton removal mechanism D, being attached to the frame of each, which insure that the two mechanisms are always maintained in 90° relationship to carton transfer mechanism C.

As shown in Figs. 1 and 7, an endless chain 78 borne between opposed sprockets 79, 80 is positioned transversely of the path of travel of and sufficiently above the level of carton transfer mechanism C, so that one of several lugs 81 borne by the chain 78 will contact the ends of cartons, in traveling along the lower flight of said chain in the direction indicated in Fig. 7. This chain is driven in a manner to be later described.

At the time that carton removal mechanism D starts its function, the carton covers are still in the downwardly extending position shown in Fig. 1; therefore, to rotate the covers 10 into upstanding position, a fixed cover rotating guide 82 is provided. This guide is in the form of a rod which extends from a generally downwardly directed free end in register with the space between the immobile carton supporting plate 69 from which the carton is being removed and its adjacent following carton supporting plate, in an upwardly and somewhat laterally directed sweep. Cover guide 82 is fastened at its opposite secured end to an upper side frame 83 of carton closing mechanism E. As cartons are ejected from transfer mechanism C, the guide 82 picks up the carton cover which then follows the upwardly directed arch or sweep thereof to its original upstanding position before operation thereon of cover depressing or rotating element 37.

While the covers 10 are being turned, the elongated carton guides 85, 86, of angled section, presenting an upstanding side wall and a horizontally extending bottom, serve to insure that cartons removed from the carton supporting plates 69 are properly positioned for subsequent pickup by the endless conveyor belt 87 of the closer E. The upper flight of belt 87 is positioned between closer frame members 83, 84 and such belt travels over appropriate pulleys, only one of which, indicated by reference numeral 88, is shown (Fig. 7). A cover rotating element 89 extends upwardly from carton closer frame 83 above the upper flight of belt 87, thence being bent downwardly in the direction of said belt to rotate the carton covers from the upwardly extending position, to which they are rotated by cover guide 82, into carton covering relation, for further cover locking operations thereon by the closer. Parallel guide rails 90, 90 insure that the carton is guided longitudinally of the conveyor belt 87 for proper operation thereon by cover rotating guide 89 and the closer.

The drive mechanism for the apparatus, whereby the foregoing instrumentalities are actuated, will next be described. Referring to Fig. 1, it will be seen that a constantly rotating shaft 91 embodied in the carton set-up machine A extends exteriorly of the framework of the latter through a bearing 92, and that on the fore-end of shaft 91 there is a fixedly mounted bevel gear 93. A bevel gear 94 fixedly mounted on a shaft 95 at a right angle to shaft 91 meshes with gear 93, said shaft 95 being borne in end bearings 96, 96. A drive sprocket 97 is fixedly attached to shaft 95 about medially of its length, which rotates a chain 98, and the latter is meshed with a driven sprocket 99. Sprocket 99 is fixedly attached to one end of an elongated shaft 100 borne in suitable bearings (not shown), which extends across the machine to give movement, as later herein described, to the carton discharge apparatus D (Fig. 7).

The sprocket 33 which actuates conveyor chain 31 (see Fig. 3) is fixedly mounted on shaft 100 which in its rotation gives movement to conveyor chain 31, while, at one side of sprocket 33 is a drive gear 101 (shown in Figs. 1 and 2) which is meshed with a pinion gear 102. Gear 102 has secured thereto a sprocket 52, and sprocket 52 rotates chain 51 which, as previously described, operates the carton accelerating mechanism, including sprockets 45, 46, chain 44 and its associated lug 47.

Also mounted on shaft 100 is a segmented drive gear 103 having teeth throughout about half of its periphery, which last named gear is meshed with another segmented gear 104 carried by shaft 105. As particularly shown in Fig. 4, gear 104 has two untoothed, milled, concave portions 107, 107 which match with the untoothed convex portion 106 of gear 103, forming between them a Geneva-type movement by which the constant rotation of shaft 100 is transformed to intermittent motion in shaft 105. This intermittent motion is transmitted through bevel gear 108 on shaft 105, to a bevel gear 109 fixedly attached to shaft 66, which is journaled at its end opposite the above mentioned pillow blocks 65 in a bearing 110. As previously described, shaft 66 drives the chains 60, 60 of intermittent carton transfer mechanism C, giving the orbitally traveling carton support plates 69 of the latter an intermittent start-stop movement.

As shown in Fig. 7, the shaft 100 at its end opposite sprocket 99 (Fig. 1) is journaled in a bearing 111 and fixedly carries a drive gear 112. Gear 112 is meshed with a driven pinion 113 and the latter is in turn meshed with another driven gear 114 fixedly mounted on a shaft 115. A sprocket 116 is disposed on shaft 115 opposite gear 114 to drive the endless chain 117, the latter driving sprocket 118. Sprocket 118 is fixedly attached to one end of a shaft 119, to the other end of which the aforementioned sprocket 80 is also attached. Hence, rotation of sprocket 80 gives movement to the carton discharge apparatus D, including chain 78 and its associated lugs 81, to discharge filled cartons onto the receiving end of carton closing mechanism E.

The entire apparatus is supported at about waist height, for convenience of operation, upon upright legs 120 fragmentarily shown in Figs. 2 and 7.

The operation of the apparatus as a unit will now be briefly described.

The carton set-up machine A, upon being put into operation, proceeds to set up and discharge cartons into the arcuate chute 21, shown in Fig. 5. Coincidentally with the start of the carton set-up machine, movement is imparted by it to endless chain 31 of the carton advancing conatively narrow, horizontally extending carton retaining guide portion 42 provided with an upwardly flared fore-lip 43. This structure serves to additionally guide and vertically retain each carton along its cover bend line 15.

As best shown in Fig. 3, a carton accelerating mechanism is positioned adjacent the discharge end of the above described carton advancing conveyor, for travel in a plane above top plate 28 at one lateral side thereof. The carton accelerating mechanism comprises an endless roller chain 44 borne on opposed sprockets 45, 46 and an outwardly extending, laterally projecting lug 47 carried by chain 44. The lower flight of chain 44 travels in the same direction as the upper flight of chain 31 and is so positioned above top plate 28 and timed in its operation that lug 47 will contact the rearward end of each carton as it is advanced by chain 31. Chain 44 travels at a predeterminedly greater speed than chain 31, whereby lug 47, upon contacting the rearward end of each carton, will speed up the carton substantially, thereby obtaining an abrupt entrance into the hereinafter described, intermittently operable, transverse carton conveyor mechanism C during a halt thereof.

In order to drive the above described accelerating mechanism, the sprocket 46 is fixedly attached to one end of a stub shaft 48 which is suitably borne in a bearing 49 (Fig. 2), and at the opposite end of shaft 48 is secured a drive sprocket 50 around which passes a drive chain 51. Chain 51 is in driven connection with a drive sprocket 52, the latter being in driven connection with certain other mechanism, to be hereinafter described, which imparts movement to all the operating parts of the machine.

The transversely extending, intermittently operative carton transfer mechanism C referred to above is located forwardly of the discharge end of carton advancing mechanism B, and its general function is to receive the cartons with their covers depressed into downwardly extending position, to hold at least three of such cartons abreast for filling during its period of immobility, and to intermittently advance the filled cartons laterally of carton advance mechanism B toward mechanism for discharging the filled cartons from said mechanism C.

As best shown in Figs. 2 and 6, the carton transfer mechanism comprises spaced, angle iron upper frame members 53, 53 rigidly held in parallel position by a transversely extending bracing plate 54 secured to their adjacent flanges, while upstanding braces 55 are spaced along the length of each member 53 to support angled lower frame members 56, 56, being secured to said last named members and to the other flange of members 53, 53. Positioned along the upper margins of upper frame members 53 are opposed parallel chain guides 57, 57 each of which comprises the vertically spaced, downwardly directed and upwardly directed rails 58, 59, respectively, these rails being so spaced apart as to provide between them a longitudinally extending groove approximating the diameter and width of the rollers of an endless roller chain 60. Two parallel endless chains 60, as shown in Figs. 2 and 6, and the upper flight of each chain 60 pass through the aforesaid groove and are vertically supported thereby at its top and bottom. Each lower side frame member 56 has the upwardly directed elongated rail 61 formed thereon, along which the lower flight of each chain 60 is guided and supported on its return movement.

The two parallel endless roller chains 60, 60 are borne on pairs of opposed sprockets 62, 62 (Figs. 3 and 7) and 63, 63 (Fig. 1) at each end of conveyor C, sprockets 62, 62 being fixedly mounted on a freely rotatable shaft 64 journaled in pillow blocks 65, 65 and sprockets 63, 63 being fixedly mounted on a lengthy, suitably journaled, driven shaft 66. Shaft 66 extends rearwardly of the apparatus for driven connection with a main drive mechanism.

In order to transfer the carton laterally, the chains 60, 60 carry a plurality of outwardly extending carton supporting transfer arms each of which comprises a U-shaped bracket 68, the free ends of which are fixedly connected to laterally opposed links of the respective aforementioned chains for orbital travel therewith. Each U-shaped bracket has a carton supporting plate 69 secured on its outer cross piece, said plates including an upturned lip 70 at one side thereof and a downturned marginal flare 71 at its opposite side, the lips 70 being downwardly beveled at the fore-end 72 thereof, see Fig. 2. The front and back edges of plates 69 terminate in free parallel edges, as shown. In order to guide and maintain the transfer arms in desired relation, each leg of bracket 68 has a short transverse bearing support 73 attached thereto to extend longitudinally of the conveyor, and roller bearings 74, 74 are carried on the ends of support 73. Said bearings contact and find support upon the upper margins of the frame-carried tracks 58 in the upwardly extending position of the carton transfer arms, as the chains 60 advance intermittently along the frame members 53. Thus said arms are effectively maintained against rocking and play in the operative position thereof.

A relatively long abutment or stop rail 75 extends longitudinally of carton advance mechanism C, being positioned exteriorly of the outermost upper frame member 53 and behind the carton support plates 69 in their upstanding position, and spaced therefrom. Rail 75 serves to act as an abutment and aligning guide for cartons as they are positioned on supporting plates 69 for lateral transfer.

As previously indicated, the carton supporting transfer arms travel intermittently with chains 60 as the latter pass around sprockets 63. As shown in Figs. 1 and 6, immediately after passing about said sprockets, the carton supporting arms assume an upright and highly stable position, since the rollers 74 travel over upper frame members 53 to sustain the arms at that point and each chain 60 is confined in the groove between rails 58, 59, thus supporting them from below against excessive rocking movement in the direction of travel. As each carton supporting transfer arm comes into register with the discharge end of carton advance mechanism B, it comes to a halt, as will be described, and the timing of carton accelerating chain 44 is such that lug 47 carried thereby abruptly ejects a carton onto the plate 69 in register therewith. Stop rail 75 prevents the cartons from overshooting the transfer arms members and aligns the fore-ends of the cartons so that the cells of adjacent cartons are in cross register, as illustrated in Fig. 8, a matter of considerable importance as will be made apparent hereinafter. When the carton is received on the intermittently operating transfer carton conveyor C, the carton bottoms thus repose uniformly on support plates 69, the front wall of the carton being in abutment with the interior surface of upturned side marginal lip 70 of the latter veyor B through rotation imparted to the drive mechanism shown and described with respect to Figs. 1, 2 and 3.

Upon arrival of each lug 34 at about the position of the uppermost lug shown in Fig. 1, T-shaped discharge member 24, which until that time had barred the opening of discharge chute 21, is swung outwardly and T-shaped arm 22 begins its downward swing, during which sweeping movement its transverse bar 25 contacts the upper margins of the upright carton cross partitions 18, causing the carton to be swept between trough sides 26, 27. The trough sides so guide the carton that it lands on its bottom upon top plates 28, 29, whereupon lug 34 contacts the carton along the lower rearward side edge thereof, progressing it forwardly.

The carton cover 10 and the locking strip and locks 12, 11 respectively, at this time are upstanding in the plane of the carton back wall 14. As the carton progresses forwardly, the free side edge of the carton cover contacts cover rotating and depressing member 37, while the carton body is held against lateral displacement from plates 28, 29 by guides 35, 36 and 39. The force imparted to the carton in its forward movement causes the cover to bend with respect to rear wall 14 along score line 15, and the continued forward progress of the carton causes the cover to follow the configuration of carton cover depressing member 37 until it reaches the fully rotated, vertical position shown in Fig. 8.

The motion given the drive mechanism shown by initiation of operation of the carton set-up machine A is also imparted to intermittent carton transfer mechanism C through the segmented gears 103, 104, particularly shown in Fig. 4 and the other mechanism otherwise shown and hereinabove described with respect to such intermittently operable mechanism. Thus during the forward progress of the carton along carton advance mechanism B, carton transfer mechanism C is operating in intermittent start-stop manner.

The timing of transfer mechanism C is such, with respect to the mechanism which precedes it, that during a halt in the operation thereof the carton accelerating mechanism comprising chain 44 and its associated lug 47 contact the carton along its upper rear side. The carton is thus given a rapid and abruptly forward shove onto a carton supporting plate 69, which has in the meantime halted in register with the discharge end of the carton advancing conveyor. The proper positioning of the carton on supporting plate 69 is assured by the guide rail 75 and by the upwardly and downwardly extending lip and flare 70 and 71, respectively, of carton supporting plates 69. As shown in Fig. 2, the vertically downwardly directed carton covers are inserted between adjacent carton supports.

The operation described above is continued until a number of egg cartons, not less than three, have been placed abreast on the transverse carton conveyor C.

One or more operators, having a supply of eggs available, standing at about position O indicated in Fig. 9, then proceed to fill the cartons. The eggs are made available on 6 x 6 three-dozen containing trays, capable of discharging the eggs through their bottoms, or they may be packed in egg cases in conventional 6 x 6 fillers and flats. In the latter instance, the eggs are preferably picked up by a device such as, for instance, that shown in U. S. Patent No. 2,011,972 to J. W. Johnson, and designated F in Fig. 9. During a halt of the transverse carton conveyor C the operator positions the filled device F over three adjacent cartons, and pulls the operating lever thereof, causing certain bottom forming slats of the device to shift from horizontal to vertical position and thereby releasing the eggs into the cells of the adjacent cartons. This is possible, as previously mentioned, inasmuch as the shape and size of the cartons and the positioning of the same in series on the conveyor apparatus is such as to duplicate the position of the cells of a conventional filler.

The operator continues the operation outlined above during intervals of halting of the conveyor, as each series of three cartons are brought to proper position for filling. The then filled cartons (see Fig. 9) continue to be intermittently progressed in the direction of the filled carton discharge apparatus particularly shown in Fig. 7.

The previously described drive mechanism for the apparatus transmits movement to the drive gear and chain assembly shown and described with respect to the carton discharge mechanism through elongated shaft 100. Chain 78 (Fig. 7) rotates at about that same accelerated speed as does chain 44 (Fig. 3), and as a filled egg carton is brought into register with carton guides 85, 86 during a halted interval of the conveyor, the travel of chain 78 is so timed that one lug 81 contacts the carton front upper side. The carton is thus given abrupt impetus onto guides 85, 86. Cover rotating guide 82 is so positioned that its free end is interposed between the carton cover and body and as the carton is ejected the cover tends to follow the upwardly directed arch of such guide and be thereby brought back to the vertically upstanding position it had prior to having been operated upon by cover depressing guide 37 (Fig. 3).

The length of carton guides 85, 86 is such that the forces of ejection imparted to the carton by chain 78 and its associated lug 81 causes the carton to over-extend the end of a flat conveyor belt 87 by which the carton is progressed forwardly. As shown in Fig. 9, cover guide means are provided in conjunction with the carton closer to further rotate the carton covers from vertical to body covering position, the closing apparatus also locking the carton hooks 10 under those hinges 19 adjacent the carton front wall 17 as fully described in the Burger U. S. Patent No. 1,994,241 mentioned hereinabove.

It is evident that the above apparatus is automatic in its functioning, involving only the intervention of an operator for depositing a group of prearranged eggs in the cells of a plurality of cartons which are arranged by the apparatus in close side-by-side relation to one another at the transfer mechanism C. The feed of the cartons to the apparatus is automatic, as well as initial retraction and final closing of the carton covers. Therefore, the method and apparatus, while effecting a considerable gain in speed during the handling and cartoning procedures, do so by employing a minimum of personnel.

We are aware that those skilled in the art will perceive many variations or modifications in the apparatus described and shown, all without departing from the principle of the invention. We therefore desire that the latter be not interpreted in an unduly narrow sense, but only as reasonably indicated within the scope of the appended claims.

What we claim is:

1. Carton handling apparatus for cartons having pairs of end and side walls and a cover hinged to a side wall, comprising a conveyor for advancing empty hinged cover type cartons in end-to-end order, means to retract the covers of the empty cartons while being advanced, a transfer device receiving cartons from the conveyor and re-orienting said cartons in closely spaced side-by-side succession, and means for actuating said transfer device in timed relation to the conveyor.

2. Carton handling apparatus for cartons having end and side walls disposed substantially at a right angle to one another and a cover hinged to one of said walls, comprising a conveyor for advancing said cartons endwise in single file, end-to-end order, means to retract the covers of the cartons from a normal position thereof as received by the conveyor, a traveling transfer device transporting said cartons sidewise, said device receiving cartons from the conveyor and re-orienting the same in closely adjacent side-by-side succession, and means receiving the cartons from said transfer device and acting thereon, including means operative to at least partially restore said carton covers toward said normal position.

3. Carton handling apparatus, comprising a conveyor for advancing cover-type cartons in single file end-to-end order, means to retract the covers of the cartons from a normal position thereof as received by the conveyor, a traveling transfer device receiving cartons from the conveyor and re-orienting the same in close side-by-side succession, means for actuating said transfer device in timed relation to the conveyor to receive and position said cartons in closely adjacent succession on the device in the direction of travel of the latter, and means receiving the cartons from said transfer device and acting thereon, including means to again arrange said cartons in end-to-end order and means operative to at least partially restore said carton covers toward said normal position.

4. Carton handling apparatus, comprising a conveyor for advancing cover-type cartons in single file, end-to-end order, means to retract the covers of the cartons from a normal position thereof as received by the conveyor and means to separate the cartons from one another during advance of the cartons, a transfer device receiving cartons from said last named means and re-orienting the same in close side-by-side succession, means for actuating said transfer device in timed relation to the conveyor to receive and position said cartons in closely adjacent relation on the device, and means receiving the cartons from said device and acting thereon, including means to again arrange said cartons in end-to-end order and means operative to at least partially restore said carton covers toward said normal position.

5. Carton handling apparatus, comprising a conveyor for advancing cover-type cartons in single file end-to-end order, means to retract the covers of the cartons from a normal position thereof as received by the conveyor and means to separate the cartons from one another lengthwise of the direction of travel of the conveyor during advance of the cartons thereby, a transfer device traveling in a direction transversely of said conveyor travel and receiving cartons from said last named means, means for actuating said transfer device in timed relation to the conveyor to receive and re-orient said cartons in closely adjacent side-by-side succession on the device in the direction of travel of the latter, and means receiving the cartons from said device and acting thereon, including means operative to at least partially restore said carton covers toward said normal position.

6. Apparatus of the type described, comprising a conveyor for moving rotatable cover-type cartons in end-to-end order, means for rotating the carton covers backwardly into vertical position while moving on said conveyor, means adjacent the end of said conveyor for accelerating the movement of cartons therealong above the speed of their initial advance, intermittent conveyor means for holding a plurality of cartons abreast for filling of a plurality thereof as a unit, means to discharge cartons from said conveyor means, and means for rotating the carton covers toward their initial position.

7. Apparatus of the type described, comprising means for supplying set-up cartons of the type having a rotatable cover one at a time, means for singly advancing each carton from said feed out means, means for rotating the carton cover into downwardly extending position adjacent the carton side wall during its advance, means for accelerating the forward progress of the carton above the speed of its initial advance, intermittently traveling conveyor means to receive each carton with its cover in downwardly extending position and to hold a plurality of cartons in close side-by-side position for filling of a plurality thereof in a single operation during an immobile period of said conveyor, and means for discharging the cartons from said last named means one at a time.

8. Apparatus of the type described, comprising means for advancing cartons of the type having a rotatable cover one at a time in a direction endwise of the carton, means for rotating the carton covers into downwardly extending position adjacent the lateral side of each carton during their advance, means for accelerating the forward progress of the carton above the speed of its initial advance, means to individually receive the cartons with their covers extending downwardly and to progress them in close side-by-side succession at an angle to their first path of travel, said last named means holding a plurality of cartons abreast for filling of a number thereof at a time, and means for discharging the cartons one at a time from the last named means.

9. A carton handling apparatus for cartons having end and side walls disposed substantially at a right angle to one another and a cover hinged to one of said walls, comprising a longitudinal conveyor feeding said cartons endwise, means automatically feeding cartons to said conveyor and operative to discharge said cartons to the conveyor in end-to-end order with the cover upstanding and uniformly positioned relative to the carton and conveyor, cover retracting means associated with the conveyor, including a fixed element cammingly engageable with said covers upon movement of the cartons by the conveyor to retract the covers to non-upstanding position, a transfer mechanism in receiving relation to said conveyor adapted to transport said cartons sidewise in close side-by-side succession, with the covers in said retracted position, past an operating station, and means on the other side of said station to restore said covers toward said upstanding position, including carton advancing means and a fixed element cammingly engageable with the covers during movement of the cartons by said last named means.

10. The method of cartoning articles, comprising supplying the articles in prearranged groups of predetermined number, linearly advancing end-to-end cartons of a multiple cell type each capable of holding a predetermined share of the articles in a group and having a bendable cover, retracting the covers thereof to an inoperative position at a side of the carton, transferring a plurality of said cartons laterally of the direction of said advance in a side-by-side relation to one another such that the cells thereof are in general conformity with the arrangement of articles in one of said groups, depositing a group in the cells of said plurality of cartons, and closing said covers while advancing the cartons in another direction.

11. Apparatus for handling cartons of the hinged cover type, comprising means to serially supply empty open cartons, cover retracting means including means successively engageable with the covers of each of said cartons to deflect said covers to a depending position relative to the carton, and horizontally traveling carton conveyor means to advance said cartons, following operation of said cover retracting means, in uniform, immediately adjacent succession to one another with said retracted carton covers in depending position between successive cartons on said conveyor means, said conveyor means including individual members engageable respectively with individual cartons to advance the same, said members being predeterminedly spaced from one another along the horizontal path of advance to insure said uniform, immediately adjacent succession of cartons.

12. Apparatus for handling elongated cartons of the hinged cover type, comprising means to serially supply empty open cartons, cover retracting means including means successively engageable with the covers of each of said cartons to deflect said covers to a depending position relative to the carton, and horizontally traveling carton conveyor means to advance said cartons in a direction transverse the length thereof, following operation of said cover retracting means, and in uniform, immediately adjacent succession to one another with said retracted carton covers in depending position between successive cartons on said conveyor means, said conveyor means comprising an endless conveyor trained about horizontally spaced end members and having individual carton supports thereon in uniform, closely adjacent relation, and means to positively guide said supports in said relation during horizontal travel between said end members.

13. Apparatus for handling elongated cartons of the hinged cover type, comprising means to serially supply empty open cartons, cover retracting means including means successively engageable with the covers of each of said cartons to deflect said covers to a depending position relative to the carton, and horizontally traveling carton conveyor means to advance said cartons, following operation of said cover retracting means, in a direction transverse their length and in uniform, immediately adjacent, front-to-rear succession to one another, said conveyor means comprising an endless conveyor having individual carton supports thereon in uniform, closely adjacent relation to receive said cartons with said depending covers between successive supports, and track means operatively engageable with said supports to positively guide the same in said relation during horizontal travel.

14. Apparatus for handling elongated cartons of the hinged cover type, comprising means to serially supply empty open cartons, means to forward said cartons in the direction of their length, cover retracting means including means successively engageable with the covers of each of said cartons during forwarding thereof by said last named means to deflect said covers to a depending position relative to the carton, and horizontally traveling carton conveyor means to advance said cartons, following operation of said cover retracting means, in a direction transverse their length and in uniform, immediately adjacent, front-to-rear succession to one another, said conveyor means comprising an endless conveyor having individual carton supports thereon in uniform, closely adjacent relation to receive said cartons with said depending covers between successive supports, and track means operatively engageable with said supports to positively guide the same in said relation during horizontal travel.

15. Apparatus for handling elongated cartons of the type characterized by a cover hinged to an elongated side thereof, comprising means to serially supply empty open cartons, cover retracting means including means successively engageable with the covers of each of said cartons to deflect said covers to a depending position relative to the carton, and horizontally traveling carton conveyor means to advance said cartons, following operation of said cover engaging means, in a direction transverse their length and in uniform, immediately adjacent, front-to-rear succession to one another, said conveyor comprising an endless conveyor trained about horizontally spaced end members, said conveyor having individual carton supports thereon in uniform and sufficiently closely adjacent relation to engage and maintain said carton covers in depending position between successive supports during travel between said end members, and means to positively guide said supports in said relation during said travel.

16. Apparatus for handling elongated cartons of the type characterized by a cover hinged to an elongated side thereof, comprising means to serially supply empty open cartons, means to forward said cartons in the direction of their length, cover retracting means including means successively engageable with the covers of each of said cartons during forwarding thereof by said last named means to deflect said covers to a depending position relative to the carton, and horizontally traveling carton conveyor means to advance said cartons, following operation of said cover engaging means, in a direction transverse their length and in uniform, immediately adjacent, front-to-rear succession to one another, said conveyor comprising an endless conveyor trained about horizontally spaced end members, said conveyor having individual carton supports thereon in uniform and sufficiently closely adjacent relation to engage and maintain said carton covers in depending position between successive supports during travel between said end members, and means to positively guide said supports in said relation during said travel.

17. Apparatus for handling enlongated cartons of the type characterized by a cover hinged to an elongated side thereof, comprising means to serially supply empty open cartons, cover retracting means including means successively engageable with the covers of each of said cartons to deflect said covers to a depending position relative to the carton, horizontally traveling carton conveyor means to advance said cartons in a direction transverse the length thereof, following operation of said cover retracting means, in uniform, immediately adjacent, front-to-rear succession to one another with said retracted carton covers depending between successive cartons on said conveyor means, and means engageable with the covers of cartons discharged from said conveyor means to close said covers.

18. Apparatus for handling elongated cartons of the type characterized by a cover hinged to an elongated side thereof, comprising means to serially supply empty open cartons, cover retracting means including means successively engageable with the covers of each of said cartons to deflect said covers to a depending position relative to the carton, horizontally traveling carton conveyor means to advance said cartons in a direction transverse the length thereof, following operation of said cover retracting means, in uniform immediately adjacent, front-to-rear succession to one another with said retracted carton covers depending between successive cartons on said conveyor means, said conveyor comprising an endless conveyor trained about horizontally spaced end members and having individual carton supports thereon in uniform, closely adjacent relation, and means to positively guide said supports in said relation during horizontal travel, and means engageable with the covers of cartons discharged from said conveyor means to close said covers.

19. A method of loading articles in cartons of the type subdivided into cells arranged in longitudinal, parallel rows and having a cover hinged to a carton wall paralleling said rows, comprising supplying articles prearranged in groups of a predetermined number which is a multiple of the number of cells in a carton, advancing said cartons endwise and serially while positioning the cover of each carton in outward depending relation to the carton wall to which it is hinged, rearranging and advancing said cartons serially sidewise and in immediate side-by-side relation in a direction normal to the length of said rows and of the cover hinging wall, with successive carton covers depending between successive cartons in planes transverse and normal to the direction of said last named advance, and in a single operation depositing a group of articles in the cells of a number of successive cartons equal to said multiple.

20. A method of loading articles in cartons of the type subdivided into cells arranged in longitudinal, parallel rows and having a cover hinged to a carton wall paralleling said rows, comprising supplying articles prearranged in groups of a predetermined number which is a multiple of the number of cells in a carton, positioning the cover of each carton in outward depending relation to the carton wall to which it is hinged, advancing said cartons serially in immediate side-by-side relation in a direction normal to the length of said rows and of the cover hinging wall, with successive carton covers depending between successive cartons in planes transverse and normal to the direction of advance, in a single operation depositing a group of articles in the cells of a number of successive cartons equal to said multiple re-orienting the loaded cartons in end to end relation, and closing said covers while transporting the loaded cartons in end to end relation.

RICHARD J. FAHEY.
MARTIN BURGER.

REFERENCES CITED

The following references are of record in the file of this patent:

UNITED STATES PATENTS

| Number | Name | Date |
|---|---|---|
| 1,592,767 | House | July 13, 1926 |
| 1,659,076 | Benoit | Feb. 14, 1928 |
| 1,839,925 | McKaig | Jan. 5, 1932 |
| 1,869,457 | Benoit | Aug. 2, 1932 |
| 1,901,928 | Olson | Mar. 21, 1933 |
| 1,929,204 | Jeffrey et al. | Oct. 3, 1933 |
| 2,045,767 | Funk | June 30, 1936 |
| 2,261,767 | Johnson | Nov. 4, 1941 |
| 2,277,688 | Cattonar et al. | Mar. 31, 1942 |